US006067630A

United States Patent [19]

Fujitomi et al.

[11] Patent Number: 6,067,630

[45] Date of Patent: May 23, 2000

[54] SIGNAL PROCESSOR

[75] Inventors: Masako Fujitomi; Yasushi Adachi, both of Tokyo, Japan

[73] Assignee: Mitsubishi Denki Kabushiki Kaisha, Tokyo, Japan

[21] Appl. No.: 08/976,181

[22] Filed: Nov. 21, 1997

[30] Foreign Application Priority Data

Jul. 11, 1997 [JP] Japan .................................... 9-187042

[51] Int. Cl.[7] ................................ G06F 1/04; G06F 1/12

[52] U.S. Cl. ............................................ 713/500; 713/600

[58] Field of Search .................................... 395/555, 551, 395/180, 559, 561; 364/514, 514 C; 713/400, 500, 600, 501; 712/200

[56] References Cited

U.S. PATENT DOCUMENTS

| | | | |
|---|---|---|---|
| 4,404,602 | 9/1983 | Hoshimi et al. | 360/13 |
| 4,789,903 | 12/1988 | Kamada et al. | 358/296 |
| 5,075,880 | 12/1991 | Moses et al. | 364/724 |
| 5,237,667 | 8/1993 | Murakami et al. | 712/200 |
| 5,247,627 | 9/1993 | Murakami et al. | 712/200 |
| 5,515,530 | 5/1996 | Eskandari | 395/180 |
| 5,519,641 | 5/1996 | Beers et al. | 364/514 |
| 5,634,043 | 5/1997 | Self et al. | 713/503 |
| 5,675,608 | 10/1997 | Kim et al. | 375/208 |
| 5,731,728 | 3/1998 | Greiss | 327/299 |
| 5,815,504 | 9/1998 | Doi | 370/503 |

*Primary Examiner*—Joseph E. Palys
*Assistant Examiner*—Willie Martin
*Attorney, Agent, or Firm*—Burns, Doane, Swecker & Mathis, LLP

[57] ABSTRACT

A signal processor sends clock and data signals from a microcomputer via two lines to two ICs of the same configuration. The ICs each have a built-in circuit for discriminating between the clock and data signals. This avoids the necessity of fabricating two kinds of ICs of different addresses, and hence obviates the need for forming extra masks in their manufacturing process, cutting their production costs.

5 Claims, 7 Drawing Sheets

200
SOUND SIGNAL PROCESSOR
SOUND SIGNAL PROCESSING IC CONTROL CIRCUIT
210
SIGNAL 1
SIGNAL 2
CLOCK 1
DATA 1
FIRST VOLUME CONTROL IC
231
SECOND VOLUME CONTROL IC
232
SECOND SOUND SIGNAL CONTROL CIRCUIT
222
FIRST SOUND SIGNAL CONTROL CIRCUIT
221
Lout
Rout
Lin
2A
Rin
2B SIGNAL 1
SIGNAL 2
SIGNAL 3
101 OUTPUT
102 OUTPUT
103 OUTPUT
111 OUTPUT
112 OUTPUT
113 OUTPUT
201 OUTPUT
202 OUTPUT
22 OUTPUT
30 OUTPUT
D0
D1
D2
D3
D4
X
T0 T1 T2
T5
T10
T15
T20 T21
T25
T30
T35
T40
T45
T50

SHIFT REGISTER
D
21
LATCH
23
OUTPUT 1
20
DATA TRANS-MISSION END DECISION CIRCUIT
30
22
A
B
204
201
202
203
DATA OUTPUT CIRCUIT
10
11
VDD
103
113
104
114
102
112
101
111
SIGNAL 1
SIGNAL 2

SIGNAL PROCESSOR

BACKGROUND OF THE INVENTION

1. Field of the Invention

The present invention relates to a signal processor which controls plural integrated circuits (ICs) having exactly the same addresses by a microcomputer via at least two lines and, more particularly, to a sound signal processor.

2. Description of the Prior Art

FIG. 6 is a block diagram showing a conventional sound signal processor, for instance. Reference numeral 121 denotes a first sound signal control circuit, 122 a second sound signal control circuit, 110 a sound signal processing IC control circuit as a central processing unit formed by a microcomputer, 131 a first volume control IC, 132 a second volume control IC, Lin a left-channel input terminal and Rin a right-channel input terminal. These elements constitute a sound signal processor 100. The sound signal processor 100 is one that takes in music signals from E. CD, cassette tape or the like via the left- and right-channel input terminals Lin and Rin and processes them to effect key control and produce a surround-echo effect. The first and second sound signal control circuits 121 and 122 take in signals 1A and 1B via the left- and right-channel input terminals Lin and Rin and perform such signal processing for key control and for surround-echo effect. The first and second volume control ICs 131 and 132 are supplied with the output from the sound signal control circuit 122 and control the volumes of left- and right-channel signals Lch and Rch, respectively. The sound signal processing IC control circuit 110, which is formed by a microcomputer, sends data and clock signals to the first and second sound signal control circuits 121 and 122 and the first and second volume control ICs 131 and 132 to control them.

SUMMARY OF THE INVENTION

With the conventional sound signal processor 100, however, in tie case where an output clock signal 2 and an output data signal 2 from the sound signal processing IC control circuit 110 for controlling the first and second volume control ICs 131 and 132 are the same signals and the first and second volume control ICs 131 and 132 are formed by the same kind of ICs, they perform exactly the same operation and hence cannot be controlled separately. As a solution to this problem, the prior art uses two ICs that have different addresses and hence operate differently.

Next, the operation of the conventional sound signal processor will be described.

FIG. 7 is a data take-in timing chart showing the output signals; from the traditional sound signal processing IC control circuit 110. Assuming that each data for the volume control ICs 131 and 132 is seven-bit, the clock signal 2 consists of 14 clock pulses, by which each IC reads therein the data. In this instance, odd-numbered pieces of data are taken in the IC as an IC control signal. Depending upon whether a fourteenth signal DE is high- or low-level (hereinafter referred to as "H" or "L"), it is determined if the data is to be fed to the volume control IC 131 or 132. For example, the volume control IC 131 is adapted to read the data only when the signal DE is "H," whereas the volume control IC 132 is adapted to read the data only when the signal DE is "L."

Since the conventional signal processor has such a construction as described above, it is necessary to prepare two kinds of ICs which have their signal DE read-in parts alone made different so as to meet the afore-mentioned requirement; however, this involves the formation of masks in the fabrication of the Ics and hence inevitably increases the manufacturing costs.

It is therefore an object of the present invention to provide a signal processor which permits separate control of plural integrated circuits (ICs) having exactly the same addresses by a microcomputer via at least two lines.

According to a first aspect of the present invention, the signal processor is provided with a central processing unit and a control circuit having a signal decision circuit which decides whether a signal sent from the central processing unit is a data or clock signal and outputs it accordingly.

Such a signal processor precludes the necessity of preparing control circuits of different addresses. This permits reduction of IC production costs because no extra mask forming step is involved in the IC manufacturing process. According to a second aspect of the present invention, the signal processor is provided with a signal decision circuit which has first and second data transmission start decision or detection circuits and a data output circuit which is supplied with the outputs from the first and second data transmission start decision or detection circuits and selects and outputs a data or clock signal.

With such a system configuration, while either one of the first and second data transmission start decision or detection circuit is taking in a signal as data, the other can be used to prevent malfunction of a shift register that is usually contained in the data output circuit.

DESCRIPTION OF THE PREFERRED EMBODIMENTS

Embodiments of the present invention will hereinbelow be described.

Embodiment 1

Figure 1:
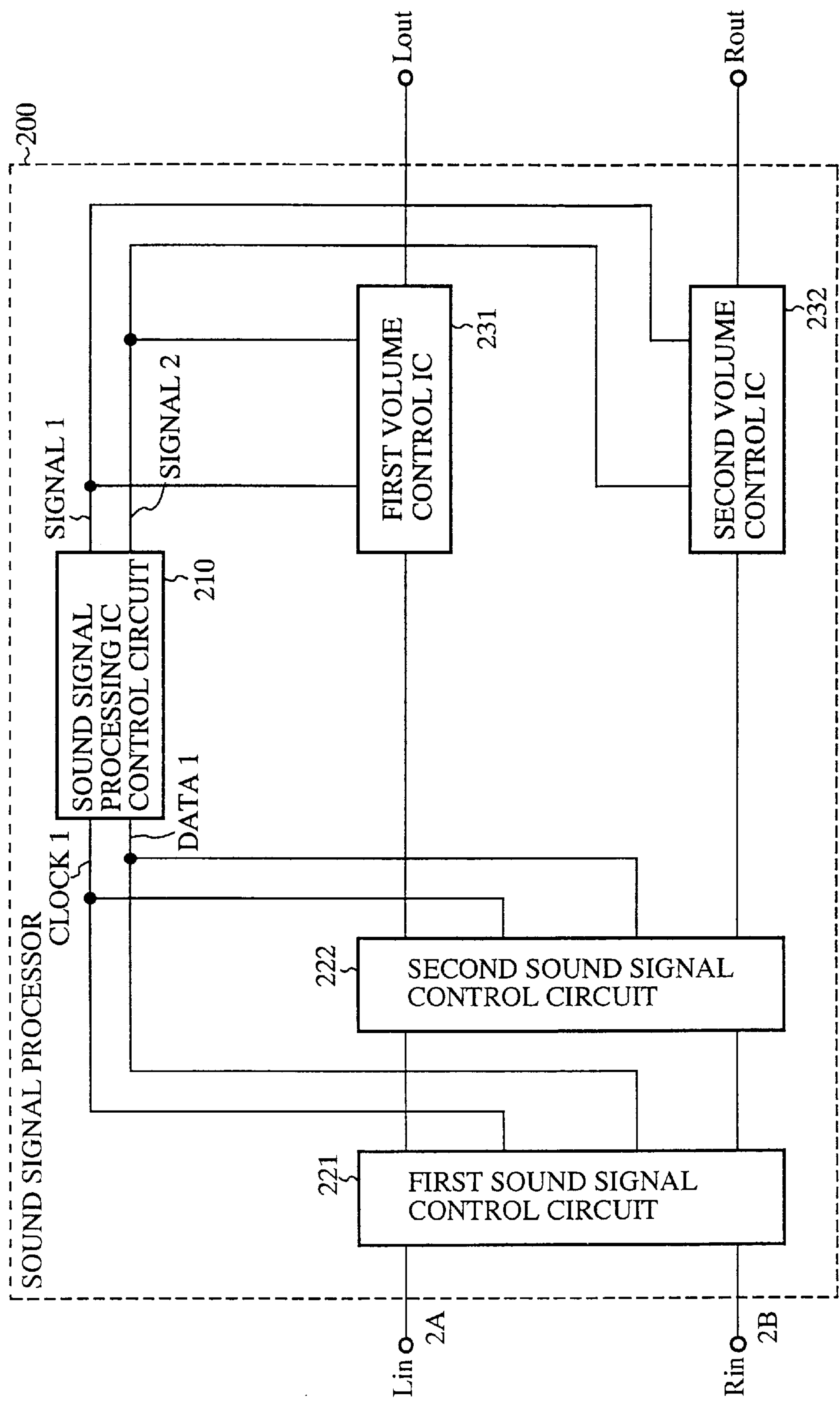
FIG. 1 is a block diagram illustrating a sound signal processor according to Embodiment 1 of the present invention.

FIG. 1 illustrates in block form the sound signal processor according to Embodiment 1 of the present invention. In FIG. 1, reference numeral 221 denotes a first sound signal control circuit, 222 a second sound signal control circuit, 210 a sound signal processing IC control circuit as a central processing unit formed by a microcomputer, 231 a first volume control IC (control circuit), 232 a second volume control IC (control circuit), Lin a left-channel input terminal, and Rin right-channel input terminal, which constitute a sound signal processor 200. The sound signal processor 200 takes in music signals from a CD, cassette tape or the like via the left- and right-channel input terminals Lin and Rin and processes them to effect key control and produce a surround-echo effect. The first and second sound signal control circuit ICs 231 and 232 receive the output from the second sound signal control circuit 222 and control the volumes of left- and right-channel input signals Lin and Rin, respectively.

In Embodiment 1, signals 1 and 2 are made different which the sound signal processing IC control circuit 210 sends to the first and second volume control ICs 231 and 232. For example, the first volume control IC 231 takes in the signal 1 as data and the signal 2 as a clock and the second volume control IC 232 the signal 2 as data and the signal 1 as a clock, thereby controlling the volumes of the left- and right-channel sound signals accordingly. Thus, the first and second volume control ICs 231 and 232 can be formed by ICs of exactly the same configuration.

Figure 2:
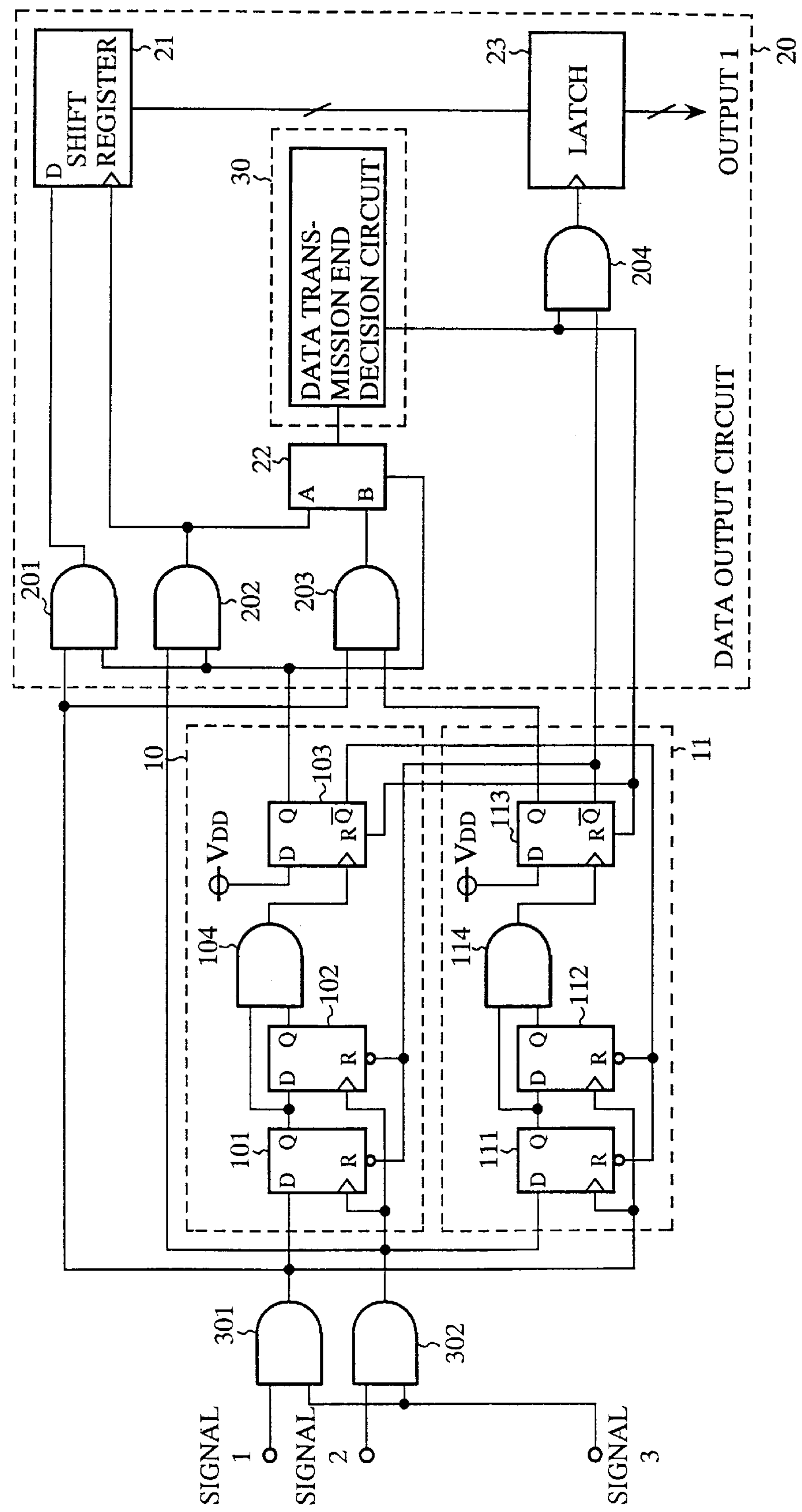
FIG. 2 is a block diagram showing a clock data decision circuit according to Embodiment 1 of the present invention.

FIG. 2 illustrates in block form a clock data decision circuit incorporated in each of the first and second volume control ICs depicted in FIG. 1. In FIG. 2, reference numeral 101, 102, 103, 111, 112 and 113 denote flip-flops, 104, 114, 201, 202, 203, 204, 301 and 302 AND circuits, 21 a shift register, 22 a selector, 23 a latch, and 30 a data transmission end decision circuit. The flip-flops 101, 102 and 103 and the AND circuit 104 constitute a data transmission start decision circuit (first data transmission start decision circuit) 10, whereas the flip-flops 111, 112 and 113 and the AND circuit 114 constitute another data transmission start decision circuit (second data transmission start decision circuit) 11. The AND circuits 201 through 204, the shift register 21, the selector 22, the latch 23 and the data transmission end decision circuit form a data output circuit 20. In this way, the clock data decision circuit shown in FIG. 2 is made up of the two data transmission start decision circuits 10 and 11 and the data output circuit 20.

Next, the operation of the sound signal processor according to the present invention will be described.

Figure 3:
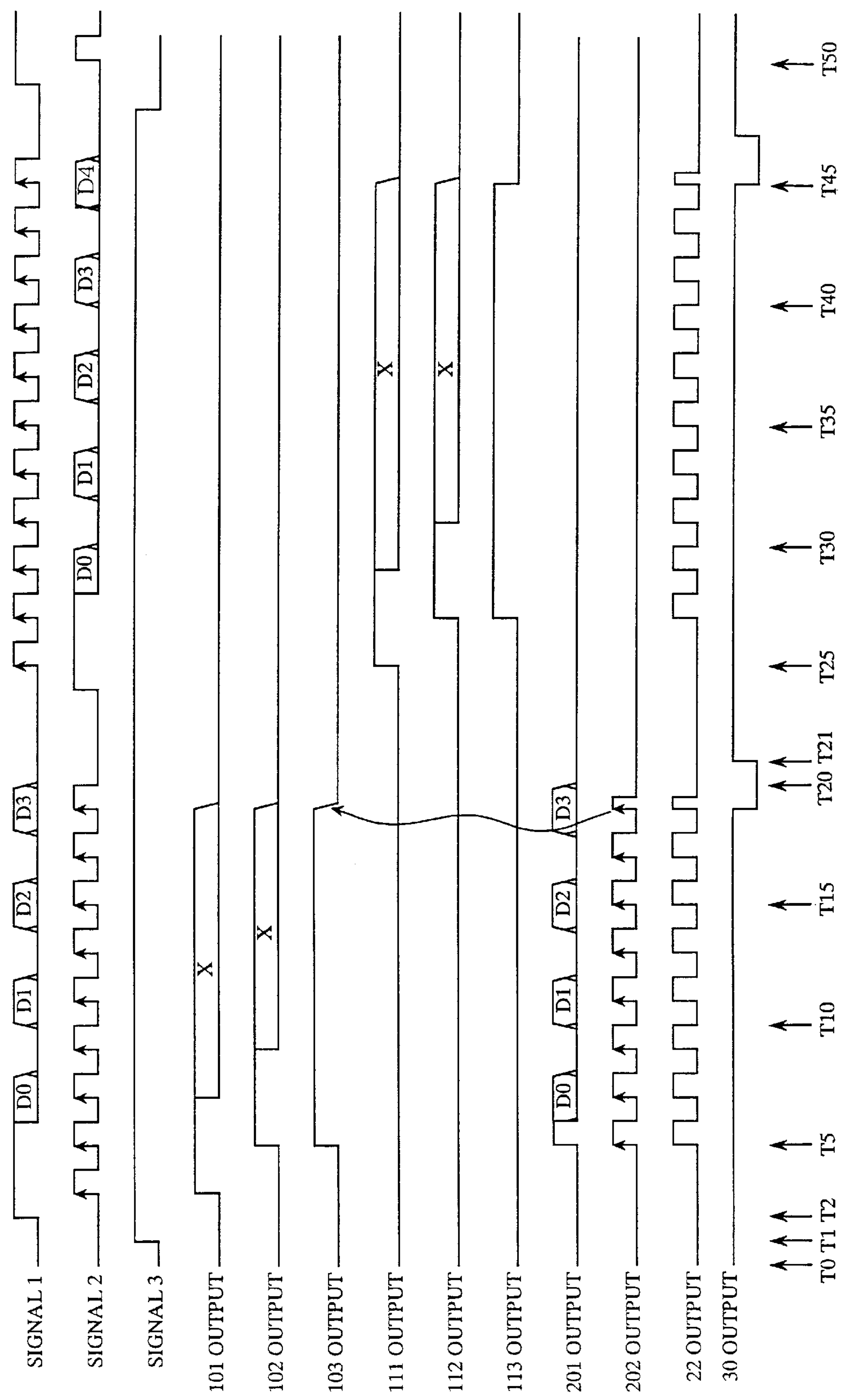
FIG. 3 is a data timing chart showing data take-in operation of the clock data decision circuit according to Embodiment 1.
Figure 4:
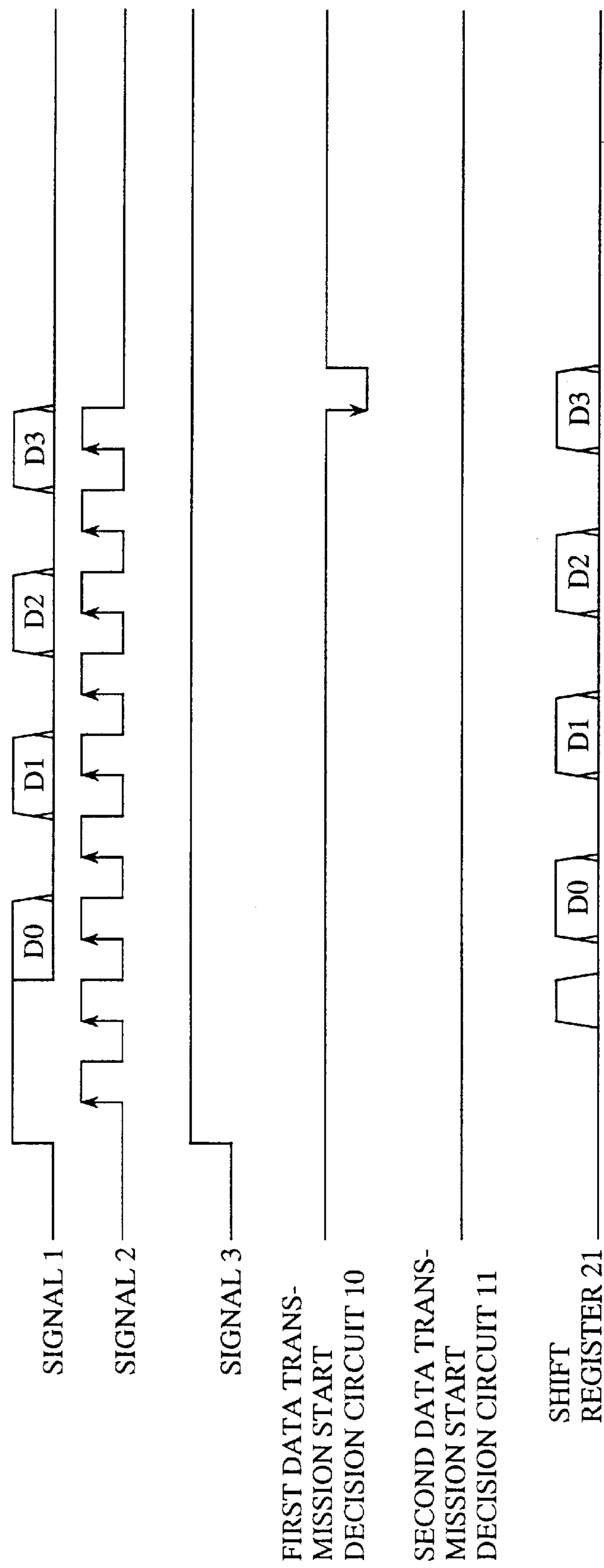
FIG. 4 is a data timing chart showing data take-in operation of the clock data decision circuit according to Embodiment 1.

FIGS. 3 and 4 are timing charts showing the data take-in operation of the clock data decision circuit in Embodiment 1. In FIGS. 3 and 4, signals 1, 2 and 3 are IC control signals from the microcomputer. The microcomputer sends a data signal as the signal 1 and a clock signal as the signal 2 from time T1 through T20 and a clock signal as the signal 1 and a data signal as the signal 2 from time T21 through T48. When the signal 3 after time T48 is a low-level ("L") input, the IC shown in FIG. 2 does not operate and the signal 3 controls the other IC when the signal 3 is "L." The data transmission start decision circuits 10 and 11 decide the timing at which data transmission is initiated. The circuit 10 operates when the signal 1 is a data signal, whereas the circuit 11 operates when the signal 2 is a data signal.

Since the data transmission start decision circuits 10 and 11 are identical in operation but differ only in that they have their signal 1 and 2 take-in parts reversed, the operation of the circuit 10 will be described. The data transmission start decision circuit 10 operates when supplied with a data signal as the signal 1 and a clock signal as the signal 2, and the data transmission start decision circuit 11 operates when supplied with a data signal as the signal 2 and a clock signal as the signal 1; no matter which signal is sent to them, both circuits decide the timing of the start and end of the data transmission. This prevents the shift register 21 of the data output circuit 20 from malfunction of taking in different data.

The flip-flop 101 takes in the signal 1 in synchronization with the rise of the signal 2 and, similarly, the flip-flop 102 takes in the output signal from the flip-flop 101 in synchronization with the rise of the signal 2. Here, every one of the flip-flops 101 to 103 and 111 to 113 provides a high-level ("H") or low-level ("L") output Q in synchronization with the rise of the clock signal, depending on whether the input signal to its data terminal D is "H" or "L" when the clock signal rises. Incidentally, an output is an inverted version of the output signal Q.

Next, a description will be given of the states of the circuit of FIG. 2 at times T0 to T21.

The AND circuit 104 is supplied with the outputs Q from the flip-flops 101 and 102 and provides a high-level ("H") signal wren the outputs Q are both "H" (that is, when the signal 1 becomes "H" twice in succession in synchronization with the rise of the clock signal 2). The flip-flop 103 receives the output from the AND circuit 104 and provides a signal "H" at its output terminal Q in synchronization with the rise of the output from the AND circuit 104. When the output Q from the flip-flop 103 is "H," the AND circuits 201 and 202 are enabled; the AND circuit 201 outputs the signal 1 and the AND circuit 202 the signal 2. These output signals are applied to the shift register 21, which takes in the signal 1 (data) in synchronization with the signal 2 (clock). In a similar manner, when the output Q from the flip-flop 103 is "H," the selector 22 selects a side A, through which the signal 2 (clock) is red into the data transmission end decision circuit 30.

When the output Q from the flip-flop 103 is "L" (T21 and thereafter), the AND circuits 201 and 202 are not enabled, and consequently, only the "L" input is fed to the shifter register 21. The selector 22 selects a side B, through which the signal 1 (clock after T21) is provided to the data transmission end decision circuit 30. The circuit 30 receives the output from the selector 22 and, when supplied with clock pulses (eight in FIG. 3) over which the shift register 21 reads all data, decides that the shift register 21 has read therein all the data, and provides as an end decision output a signal "L" for two cycle periods (T19 to T21). Since the flip-flop 113 of the data transmission start decision circuit 11, which performs an operation opposite to that of the circuit 10, provides a signal "H" frog its output terminal, the circuits 10 and 11 are reset by the signal "L" from the end decision circuit 30 and the input to the AND circuit 204 also becomes "L" for a while. As a result, when the output signal from the end decision circuit 30 rises (at time T21), an instruction for volume level control or the like is sent from the latch 23 via an output 1 to a device that actually executes the instruction.

As described above, according to Embodiment 1, there is no need of fabricating ICs having different parts for reading the signal DE as in the prior art. Hence, masks corresponding to such ICs need not be prepared in their manufacture--this permits reduction of their production cuts.

Modification 1

Figure 5:
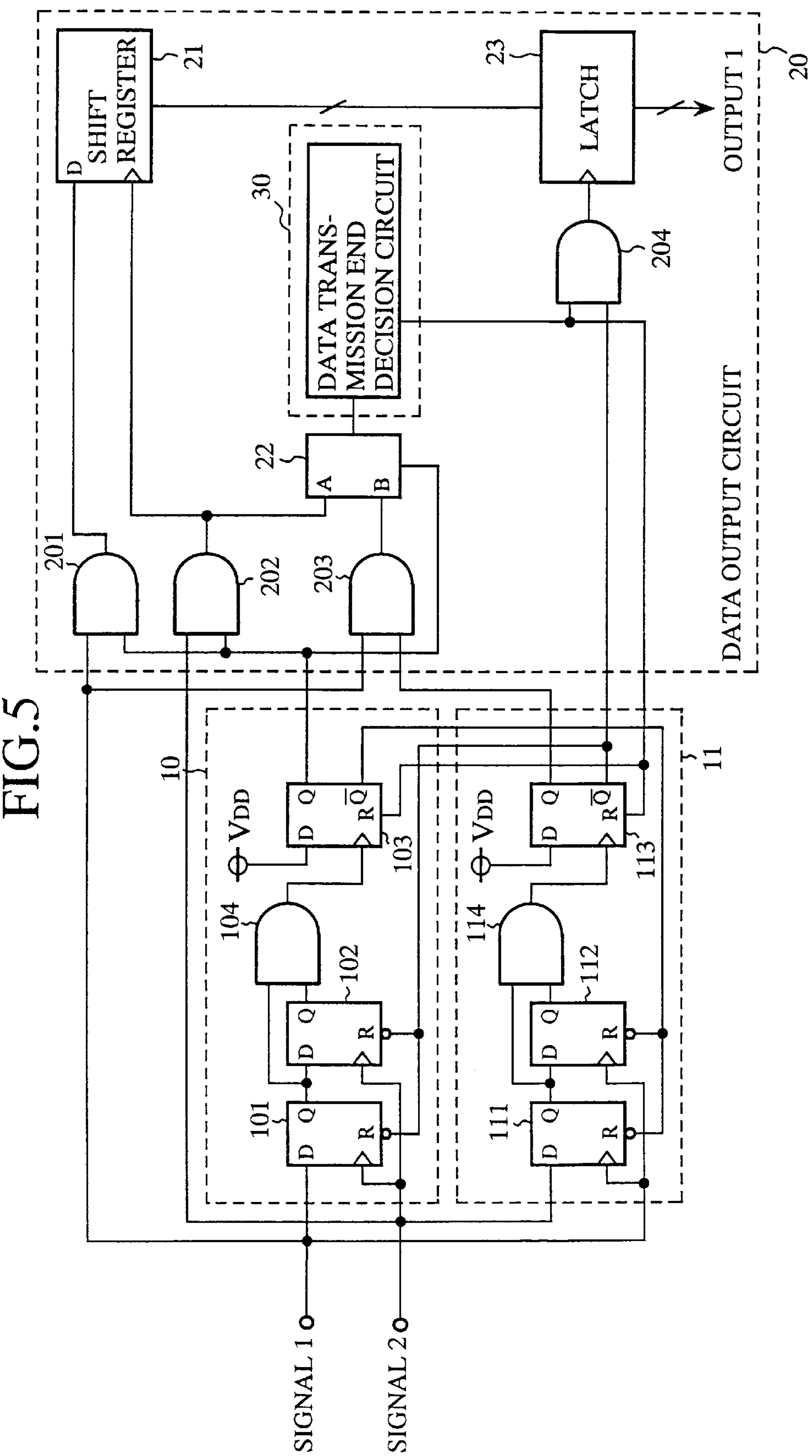
FIG. 5 is a block diagram illustrating Modification 1 of the clock data decision circuit according to Embodiment 1 of the present invention.
Figure 6:
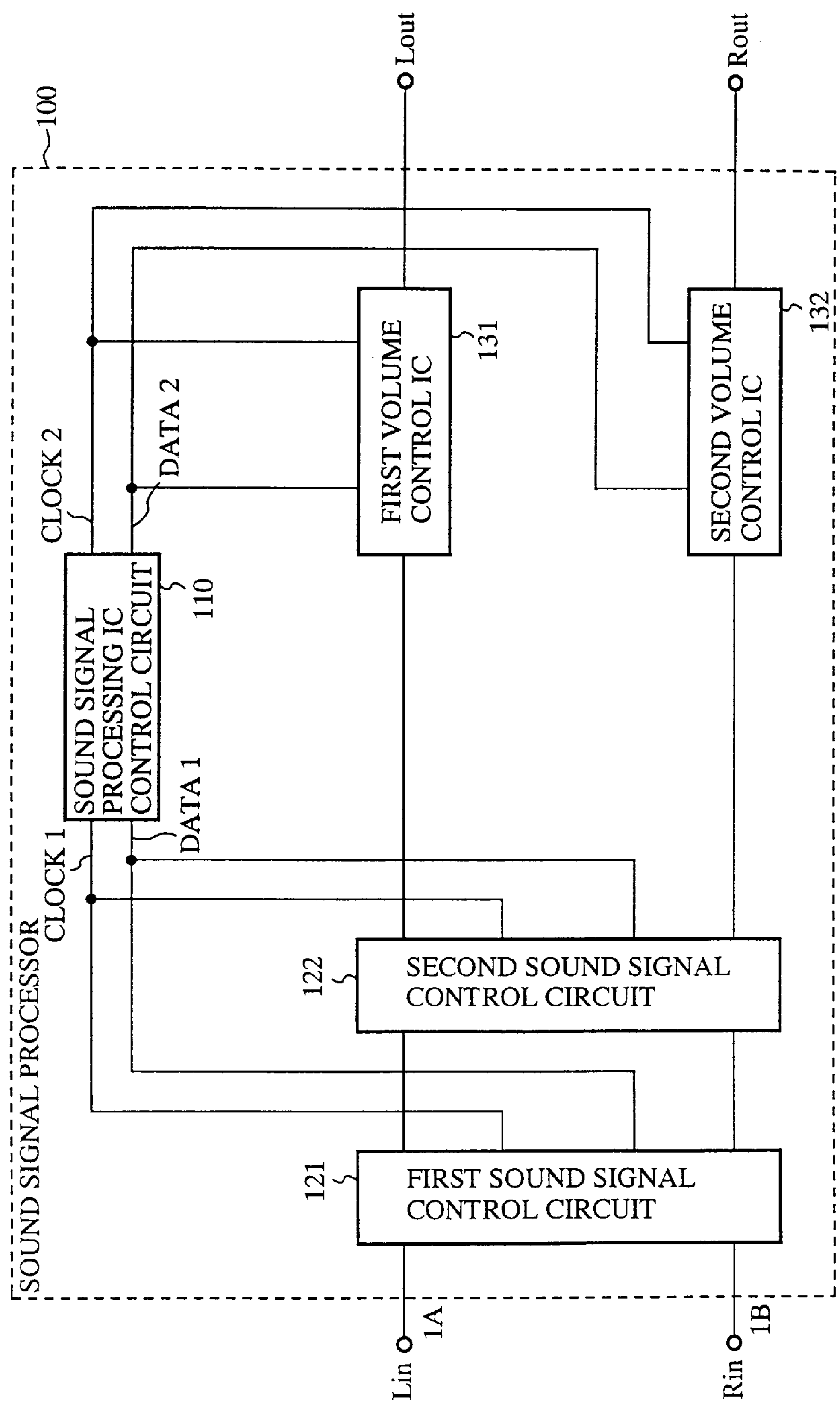
FIG. 6 is a block diagram showing a conventional sound signal processor.
Figure 7:
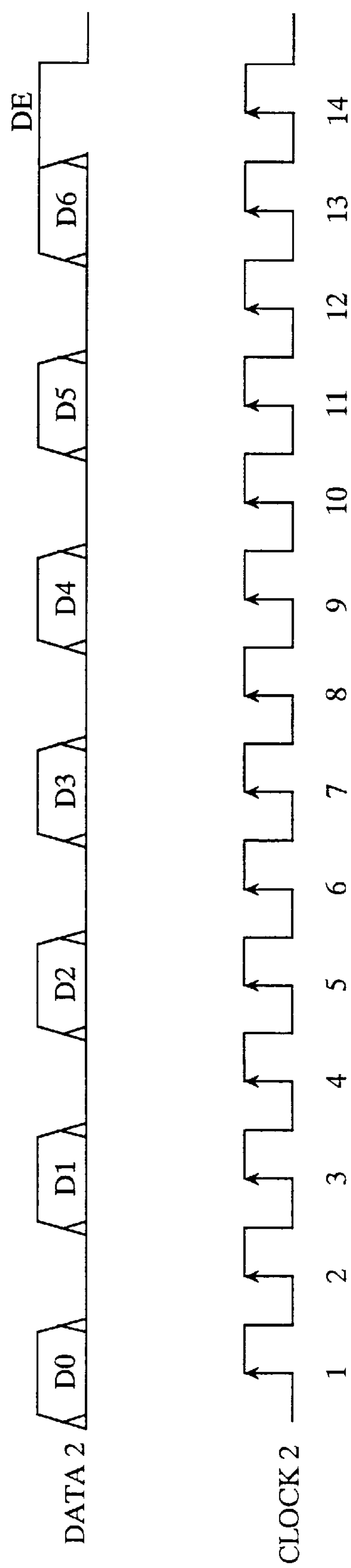
FIG. 7 is a data take-in timing chart showing the output signal from a conventional sound signal processing IC control circuit.

FIG. 5 illustrates in block form a modified form of the clock data decision circuit according to Embodiment 1. The illustrated circuit is identical in construction with the clock data decision circuit of FIG. 2 except that while in the latter the signals 1, 2 and 3 are input via the AND circuits 301 and 302, the signals 1 and 2 are input directly in the latter. The parts corresponding to those in FIG. 2 are identified by the same reference numerals and no detailed description will not repeated. Needless to say, the clock data decision circuit of Modification 1 also produces the same effects as obtainable with Embodiment 1.

It will be apparent that many modifications and variations may be effected without departing from the scope of the novel concepts of the present invention.

What is claimed is:

1. A signal processor comprising:

a central processing unit for generating data and a clock signal;

and a control circuit for receiving both the data and the clock signal, the control circuit having a signal decision circuit for deciding whether a signal sent from said central processing unit is a data or clock signal and for outputting selected portions of the data;

wherein said signal decision circuit is provided with first and second data transmission start decision circuits and a data output circuit which is supplied with the outputs from said first and second data transmission start decision circuits and outputs the selected portions of the data.

2. A signal processor according to claim 1, wherein when the signal sent from said central processing unit includes two control signals, said control circuit is capable of executing different operations by connecting said two control signals reversely.

3. A signal processor according to claim 1, wherein the data and clock signal sent from said central processing unit include first and second control signals, each containing alternating time segments of clock signals and data signals.

4. A signal processor according to claim 3, wherein the selected portions comprise data contained in the first control signal.

5. A signal processor comprising:

a central processing unit for generating first and second signals, each of said first and second signals providing alternating time segments of clock signals and data signals;

a first control circuit for receiving both said first and second signals, wherein said first control circuit takes in the first signal as data and the second signal as a clock;

said first control circuit including a first decision circuit for receiving both said first and second signals and for outputting only the data contained in said first signal;

a second control circuit for receiving both said first and second signals, wherein said second control circuit takes in the second signal as data and the first signal as a clock;

said second control circuit including a second decision circuit for receiving both said first and second signals and for outputting only the data contained in said second signal.

* * * * *

UNITED STATES PATENT AND TRADEMARK OFFICE

CERTIFICATE OF CORRECTION

PATENT NO. : 6,067,630
DATED : May 23, 2000
INVENTOR(S) : Fujitomi et al.

It is certified that error appears in the above-indentified patent and that said Letters Patent is hereby corrected as shown below:

on the title page, Under [56] References Cited, kindly add the following:

FOREIGN DOCUMENTS 58-85494 5/1983 Japan

Signed and Sealed this

Third Day of April, 2001

Attest:

NICHOLAS P. GODICI

Attesting Officer

*Acting Director of the United States Patent and Trademark Office*

UNITED STATES PATENT AND TRADEMARK OFFICE

CERTIFICATE OF CORRECTION

PATENT NO. : 6,067,630
DATED : May 23, 2000
INVENTOR(S) : Fujitomi et al.

It is certified that error appears in the above-identified patent and that said Letters Patent is hereby corrected as shown below:

Item [56] References Cited, kindly add the following:
FOREIGN DOCUMENTS
58-85494 5/1983 Japan Signed and Sealed this Twenty-fifth Day of December, 2001

Attest:

JAMES E. ROGAN

*Attesting Officer* *Director of the United States Patent and Trademark Office*